United States Patent
Cangioli et al.

(10) Patent No.: US 12,320,265 B2
(45) Date of Patent: Jun. 3, 2025

(54) INTEGRATED HERMETICALLY SEALED TURBOEXPANDER-GENERATOR WITH OVERHUNG TURBOMACHINE

(71) Applicant: NUOVO PIGNONE TECNOLOGIE—S.R.L., Florence (IT)

(72) Inventors: Francesco Cangioli, Florence (IT); Davide Biliotti, Florence (IT); Massimiliano Ortiz Neri, Florence (IT); Giuseppe Sassanelli, Florence (IT); Vittorio Michelassi, Florence (IT)

(73) Assignee: Nuovo Pignone Tecnologie—S.R.L., Florence (IT)

( * ) Notice: Subject to any disclaimer, the term of this patent is extended or adjusted under 35 U.S.C. 154(b) by 0 days.

(21) Appl. No.: 17/907,184

(22) PCT Filed: Mar. 19, 2021

(86) PCT No.: PCT/EP2021/025110
§ 371 (c)(1),
(2) Date: Sep. 23, 2022

(87) PCT Pub. No.: WO2021/197664
PCT Pub. Date: Oct. 7, 2021

(65) Prior Publication Data
US 2023/0117632 A1 Apr. 20, 2023

(30) Foreign Application Priority Data
Mar. 31, 2020 (IT) .................. 102020000006727

(51) Int. Cl.
*F01D 25/24* (2006.01)
*F01D 15/10* (2006.01)
(Continued)

(52) U.S. Cl.
CPC ............. *F01D 25/24* (2013.01); *F01D 15/10* (2013.01); *F02C 6/18* (2013.01); *F02C 7/06* (2013.01);
(Continued)

(58) Field of Classification Search
CPC .. F01D 25/24; F01D 15/10; F02C 6/18; F02C 7/06; F02C 1/10; H02K 7/09;
(Continued)

(56) References Cited

U.S. PATENT DOCUMENTS

| 6,651,433 B1 | 11/2003 | George |
| 2004/0093869 A1 | 5/2004 | Larjola et al. |

(Continued)

FOREIGN PATENT DOCUMENTS

| CN | 1653253 A | 8/2005 |
| CN | 203880993 U | 10/2014 |

(Continued)

*Primary Examiner* — Joseph Ortega
(74) *Attorney, Agent, or Firm* — Paul Frank + Collins P.C.

(57) ABSTRACT

An integrated hermetically sealed turboexpander-generator comprises a hermetically sealed casing arrangement, a turboexpander, a compressor and an electric generator, arranged in the hermetically sealed casing arrangement along a common shaft line, supported by active magnetic bearings. Also disclosed is a thermodynamic system using the integrated hermetically sealed turboexpander-generator to convert waste heat from a waste heat source into electric power. One of the turboexpander and of the compressor comprises two sections arranged in an overhung configuration at the ends of the common shaft line.

15 Claims, 7 Drawing Sheets

(51) Int. Cl.
*F02C 6/18* (2006.01)
*F02C 7/06* (2006.01)
*H02K 7/09* (2006.01)
*H02K 7/18* (2006.01)

(52) U.S. Cl.
CPC .............. *H02K 7/09* (2013.01); *H02K 7/1823* (2013.01); *F05D 2220/76* (2013.01); *F05D 2240/51* (2013.01); *F05D 2240/55* (2013.01); *F05D 2260/211* (2013.01)

(58) Field of Classification Search
CPC .............. H02K 7/1823; F05D 2220/76; F05D 2240/51; F05D 2240/55; F05D 2260/211; F05D 2220/62
See application file for complete search history.

(56) References Cited

U.S. PATENT DOCUMENTS

| | | |
|---|---|---|
| 2005/0056001 A1 | 3/2005 | Frutschi et al. |
| 2006/0197345 A1 | 9/2006 | Kuroki et al. |
| 2013/0241203 A1 | 9/2013 | Kleen et al. |
| 2014/0119881 A1 | 5/2014 | Kalra et al. |
| 2017/0016577 A1 | 1/2017 | Sinatov et al. |
| 2017/0023011 A1 | 1/2017 | Berti et al. |
| 2019/0041124 A1 | 2/2019 | Berti et al. |
| 2019/0063257 A1 | 2/2019 | Fioravanti et al. |
| 2019/0249599 A1 | 8/2019 | Sen et al. |
| 2021/0254510 A1* | 8/2021 | Waki ...................... F01K 23/10 |

FOREIGN PATENT DOCUMENTS

| | | |
|---|---|---|
| CN | 108885055 A | 11/2018 |
| CN | 110159429 A | 8/2019 |
| FR | 1336318 | 8/1963 |
| JP | 2003193865 A | 7/2003 |
| WO | 02/23014 A1 | 3/2002 |
| WO | 2016137442 A1 | 9/2016 |
| WO | WO-2017153387 A1 * | 9/2017 ........... F01D 15/005 |

\* cited by examiner

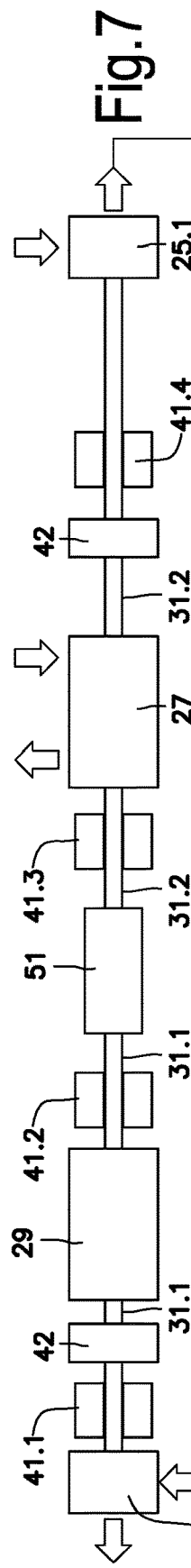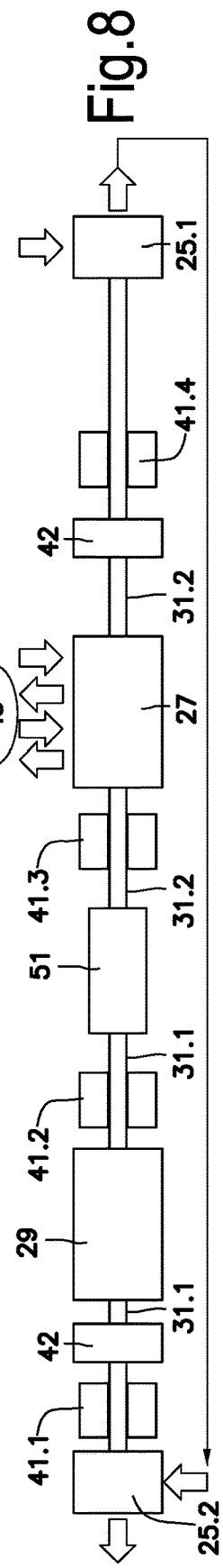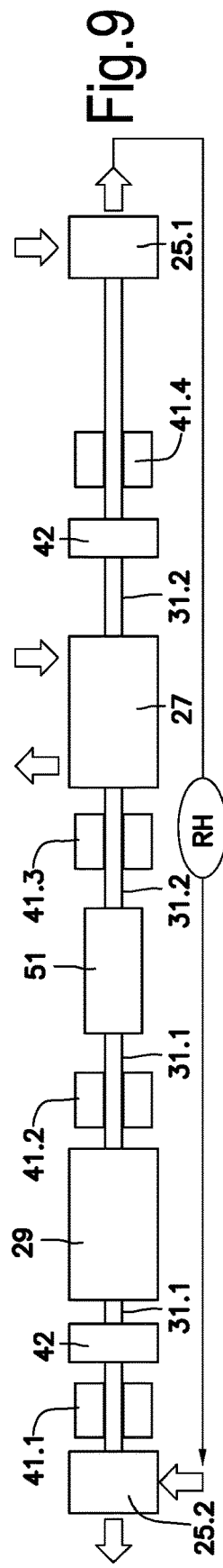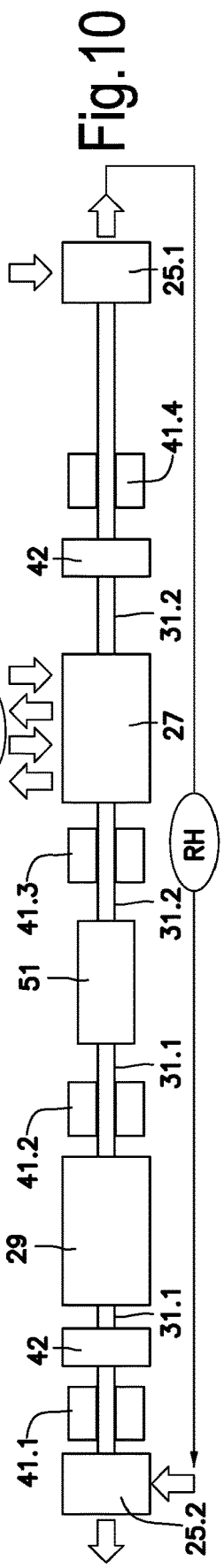

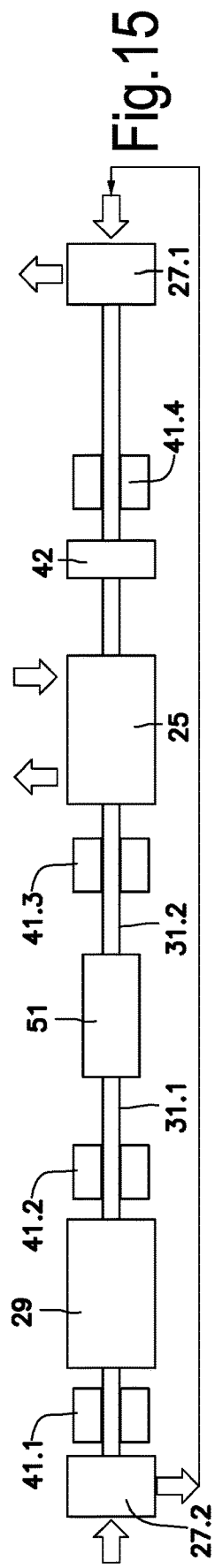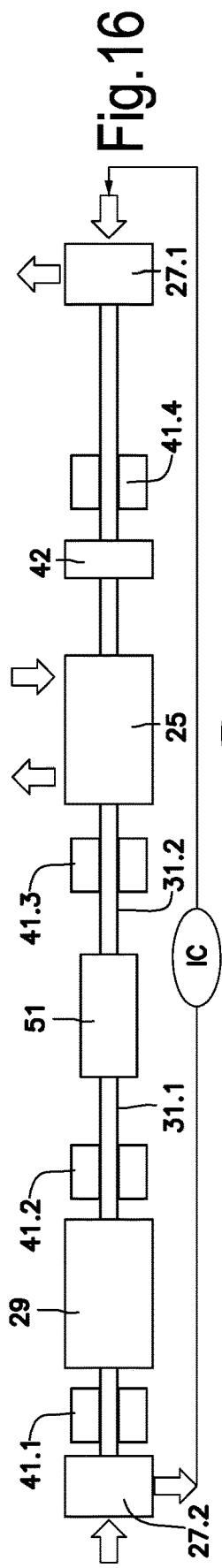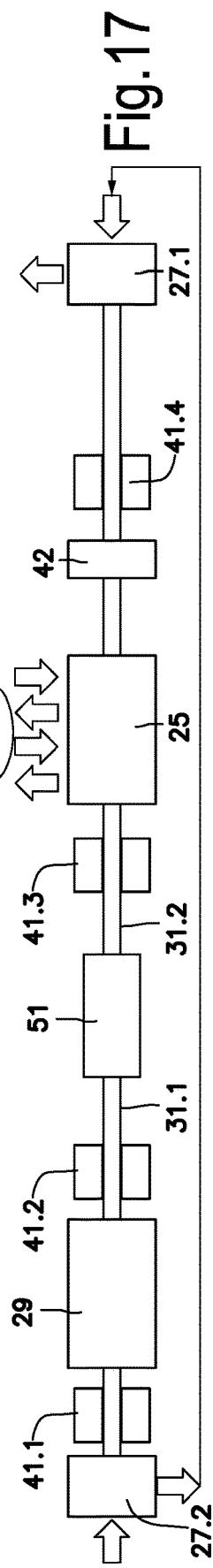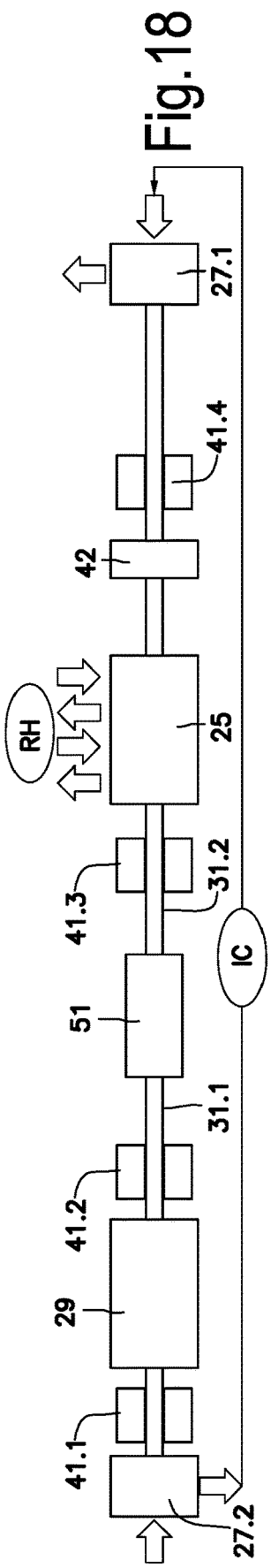

INTEGRATED HERMETICALLY SEALED TURBOEXPANDER-GENERATOR WITH OVERHUNG TURBOMACHINE

TECHNICAL FIELD

Disclosed herein are integrated turbomachines. More specifically, embodiments of the present disclosure concern combined turbomachines and generators adapted to convert thermal energy into electrical energy.

The present disclosure also concerns thermodynamic systems including turbomachines and generators for waste heat recovery.

BACKGROUND ART

Several industrial processes produce a large amount of waste heat. Typical examples of waste heat generating processes are industrial processes for steel, glass and cement production. Other examples are thermodynamic processes for the generation of mechanical or electric power by conversion of thermal power generated by fuel combustion. Typically, power generation processes using fuel convert less than 45% of the thermal power generated by combustion into useful electric or mechanical power. The temperatures of the exhaust combustion gas range typically between 300° C. and 700° C. and the exhaust thermal power can be worth multi MW (megawatt). The heat contained in the exhaust combustion gas is discharged in the environment and wasted. This has a severe environmental impact.

Systems already exist, which allow capturing part of the waste heat and convert it into useful power, or use it as such, for instance for heating of buildings. However, existing systems for converting part of the waste heat in useful electrical or mechanical power are complex and expensive, require large footprint and are demanding in terms of operational costs. They may also underperform in off design conditions.

A need therefore exists for machines and systems, which overcome or alleviate one or more of the drawbacks of the systems of the current art mentioned above.

SUMMARY

Disclosed herein is an integrated hermetically sealed turboexpander-generator, comprising a hermetically sealed casing arrangement, wherein a turboexpander, a fluid pressurizing turbomachine and an electric generator are arranged. The turboexpander, the electric generator and the fluid pressurizing turbomachine are mounted along the same shaft line, such that they rotate at the same speed. One of the turboexpander and the fluid pressurizing machine comprises a low-pressure section and a high-pressure section fluidly coupled to one another and arranged at opposite ends of the shaft line in an overhung configuration.

The novel arrangement reduces the thermal load on the electric generator and provides for high energy efficiency of the combined rotary machine.

As used herein, a fluid pressurizing turbomachine is a turbomachine adapted to pressurize the working fluid flowing through the integrated machine. If the fluid is in a liquid state, the fluid pressurizing turbomachine includes a pump. If the fluid is in the gaseous state, the fluid pressurizing turbomachine includes a compressor. The nature of the fluid pressurizing turbomachine used depends mainly on the kind of thermodynamic cycle in which the integrated hermetically sealed turboexpander-generator is used. Usually, the fluid pressurizing turbomachine comprises a compressor, as Brayton cycles or other cycles not involving a change of phase of the working fluid are preferably involved in waste heat recovery. However, the possibility is not excluded of using a Rankine cycle or other cycles involving a phase change in the working fluid. In such case usually the fluid pressurizing turbomachine includes a pump.

As used herein, a hermetically sealed casing arrangement may include a single casing, which houses the three rotary machines mentioned above, with a common shaft extending therethrough. Rotary seals can be provided along the shaft, to prevent leakages from one rotary machine to the other, for example to separate the cooling gas of the electric generator from the working fluid processed through the turboexpander and the fluid pressurizing turbomachine. No rotary parts of the machine are however exposed outside the casing arrangement, such that leakages towards the environment are prevented.

The hermetically sealed casing arrangement may, however, also include two or more casings, each of which is hermetically sealed and houses one or two of the rotary machines mentioned above, i.e. the turboexpander, the fluid pressurizing turbomachine and the electric generator. In such case, torque is transmitted from one casing to the other through a magnetic joint, such that also in this case no rotating mechanical part is exposed towards the exterior of the casing arrangement, which remains hermetically sealed as a whole.

As used herein, a common shaft line can consist of a single shaft or of shaft line portions, i.e. separate shafts, which are coupled to one another physically by a joint, such as a flexible joint, or magnetically, through a magnetic joint, such that the whole shaft line rotates at the same rotary speed, except as far as the oscillations permitted by the joint are concerned. No gears or speed manipulating devices are required between rotary machines.

The common shaft line of the turboexpander, electric generator and fluid pressurizing turbomachine is supported by active magnetic bearings, thus avoiding the use of rolling bearings, as well as hydrostatic or hydrodynamic bearings. A lubricant or load bearing fluid circuit is thus not required, making the integrated and hermetically sealed machine simpler, less expensive and less critical as far as potential lubricant leakages are concerned.

In embodiments, the same working fluid is used also for cooling the active magnetic bearings of the integrated, hermetically sealed turboexpander-generator and for further cooling the electric generator.

The integrated, hermetically sealed turboexpander-generator is thus connected to the outside world only through the following:
   fluid inlet and fluid outlet, hermetically sealed flanges of the turboexpander, which connect the turboexpander to the heater required to heat the working fluid, such as a heat exchanger receiving waste heat from a waste heat source;
   inlet and outlet hermetically sealed compressor or pump flanges, connected to the external cooling system;
   power cables powering the active magnetic bearings;
   power cables of the electric generator.

If required, additional flanges can be provided for circulating a cooling medium through or around the active magnetic bearings and the electric generator. As mentioned, the same working fluid can be used as cooling medium for the active magnetic bearings and/or for the electric generator. Suitable heat exchangers can be provided to keep the working fluid circulating in the active magnetic bearings and electric generator at suitable temperature, removing heat form the active magnetic bearings and from the electric generator.

No rotary mechanical component projects from the hermetically sealed casing arrangement towards the environment.

In currently preferred embodiments, both the turboexpander and the fluid pressurizing turbomachine are multi section turbomachines, in which each section comprises at least one stage. In an overhung arrangement, a respective one of the at least two sections of the turboexpander can be arranged at each of the two opposite ends of the shaft line in a cantilever fashion, i.e. mounted overhung outboard the last radial bearing. The multi-stage/multi-section configuration allows reaching high pressure and temperature ratios, adapted to achieve high thermodynamic cycle efficiencies.

In other overhung arrangements, a respective one of the at least two sections of the fluid pressurizing turbomachine is mounted in an overhung arrangement at the each of the two opposite ends of the shaft line.

A compact combined, hermetically sealed machine is thus provided, which has limited dimensions and reduced cost.

Thus, the three machines (turboexpander, fluid pressurizing turbomachine and electric generator) required to convert waste heat into useful electric power are merged in a single, integrated, hermetically sealed machine. The hermetical seal avoids gas leakages in any operating conditions, thereby avoiding the need for any working fluid reintegration and also avoiding environmental pollution.

The use of active magnetic bearing avoids the need for any lubrication and possible contamination of the working fluid by the lubricant.

The single shaft line is driven by the turboexpander (turbine) that drives both driven machines, namely the electric generator and the fluid pressurizing turbomachine (compressor or pump). This simple layout allows large flexibility in the assembly, as it is possible to include turboexpander reheating and/or compressor intercooling without modifying the machine.

Embodiments and features of the integrated hermetically sealed turboexpander-generator are outlined below, reference being made to the attached drawings, and are set forth in the appended claims, the content whereof form an integral part of the present description.

Disclosed herein is also a thermodynamic system including a waste heat source, adapted to directly or indirectly transfer heat to a working fluid processed through an integrated, hermetically sealed turboexpander-generator as outlined above, to convert part of the waste heat into electrical power.

Embodiments of the thermodynamic system are described below with reference to the attached drawings.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein:

FIGS. 3 to 18 illustrate schematics of the integrated turboexpander-generator in several embodiments;

DETAILED DESCRIPTION

To provide a more compact and less expensive thermodynamic system for recovering waste heat, a hermetically sealed integrated turboexpander-generator is disclosed herein, which includes a hermetically sealed casing arrangement, which houses a turboexpander and a fluid pressurizing turbomachine, in combination with the electric generator, which converts mechanical power generated by the turboexpander into electric power. The integrated, hermetically sealed combined machine avoids leakages along rotary shafts towards the outside environment, and avoids the need to connect separate rotary machines by shafts extending through the respective casings. A compact and leakage-free combination of rotary machines is thus obtained. A common shaft line, including the rotor of the electric generator, the rotary parts of the turboexpander and the rotary parts of the fluid pressurizing turbomachine, is supported by active magnetic bearings, such that lubrication circuits can be dispensed with. One of the two turbomachines includes a low-pressure section and a high-pressure section fluidly coupled in sequence and arranged at a first end and at a second end of the shaft line, respectively. Preferably, the electric generator is arranged adjacent the low-pressure section of the turbomachine, the two sections whereof are arranged at the ends of the shaft line. This arrangement reduces the thermal load on the electric generator. Several useful arrangements of the various rotary machines will be described in detail here below.

The integrated turboexpander-generator can be used in a closed Brayton cycle using a suitable working fluid such as $CO_2$ in a supercritical cycle. The fluid pressuring turbomachine will in such case include a compressor. The use of a Rankine cycle for waste heat recovery is, however, not excluded. In such case the fluid pressurizing turbomachine includes a pump.

In the following description reference will be made to a system using waste heat from the exhaust combustion gas from a gas turbine engine. Those skilled in the art will nevertheless understand that the integrated turboexpander-generator and the relevant thermodynamic cycle disclosed herein can be used for recovering waste heat from other sources, such as any industrial process which produces waste heat at a suitable temperature as a by-product of the process. Different working fluids can be used in the thermodynamic cycle depending, inter alia, upon the temperature level of the waste heat. Specifically, supercritical carbon dioxide cycles can be used, but the use of other working fluids, e.g. other organic fluids such as pentane and cyclopentane, is not excluded.

Figure 1:
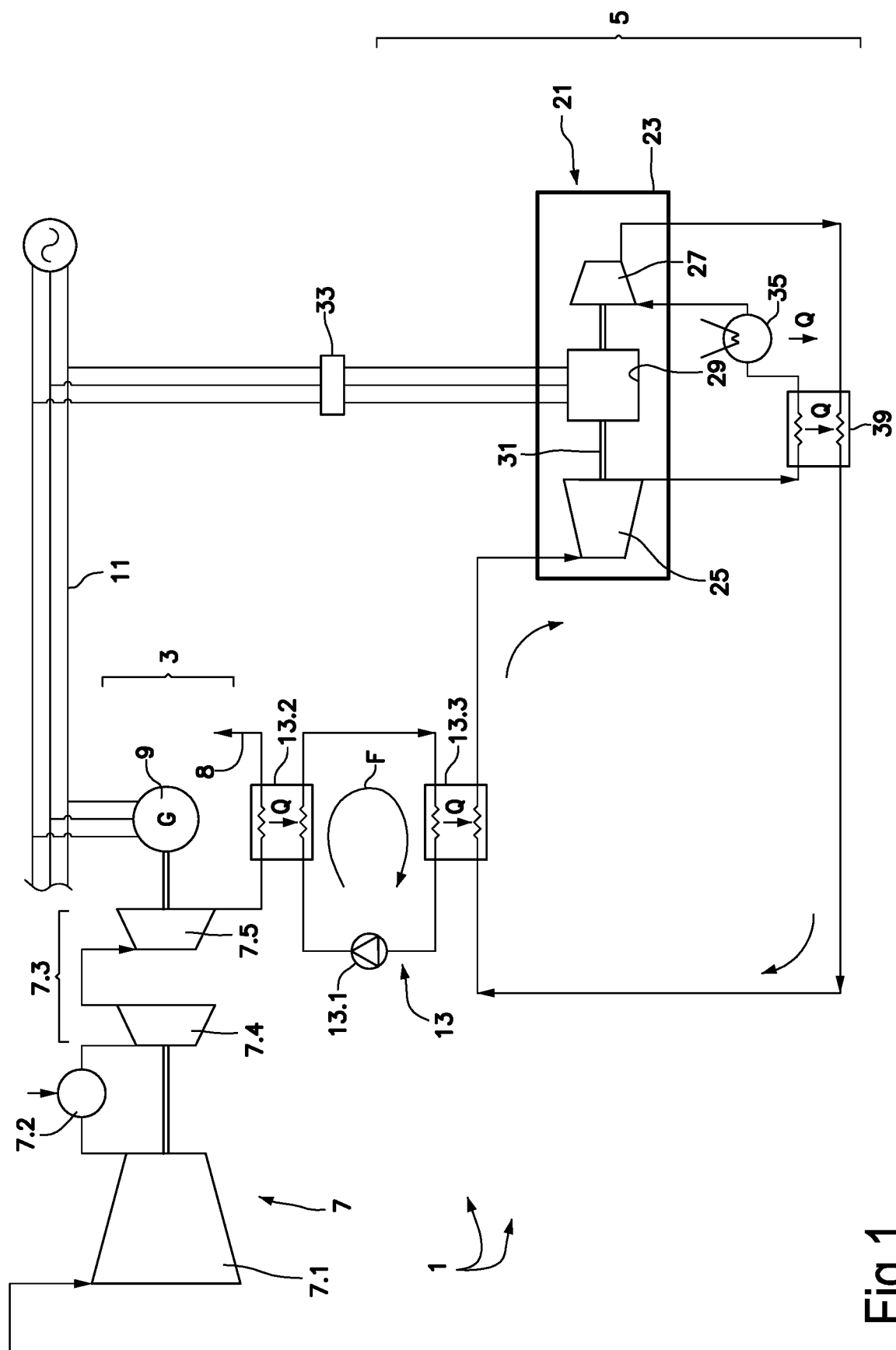
FIGS. 1 and 2 illustrate schematics of a thermodynamic system according to the present disclosure in two embodiments.

Referring now to FIG. 1, a simplified thermodynamic system 1 includes a source of waste heat 3 and a waste heat recovery circuit 5. In the embodiment of FIG. 1 the waste heat source includes a gas turbine engine 7, which is configured for power generation, i.e. for generating electric power through an electric generator 9, electrically coupled to an electric power distribution grid 11.

In other embodiments, the gas turbine engine 7 can be configured for mechanical drive, i.e. the mechanical power generated by the gas turbine engine 7 can be used as such, rather than being converted into electric power. Mechanical power can be exploited to drive a compressor or a compressor train, for instance in a natural gas liquefaction system or in a gas pipeline.

In the exemplary embodiment of FIG. 1 the gas turbine engine 7 is a two-shaft gas turbine engine, including an air compressor 7.1, a combustion chamber 7.2 and a turbine section 7.3. The turbine section 7.3 comprises a high-pressure turbine 7.4 and a low-pressure turbine 7.5. In a manner known per se, the high-pressure turbine 7.4 is mechanically coupled to the air compressor 7.1 and the low-pressure turbine 7.5 is mechanically coupled to the electric generator 9. Compressed air from the air compressor 7.1 is mixed with fuel and the mixture is ignited, to generate compressed, high-temperature combustion gas in combustion chamber 7.2. The compressed, high-temperature combustion gas is expanded sequentially in the high-pressure turbine 7.4 to generate power to drive the air compressor 7.1, and in the low-pressure turbine 7.5 to generate power to drive the electric generator 9.

While in FIG. 1 a two-shaft gas turbine engine is illustrated, in other embodiments the gas turbine engine 7 may be a one-shaft gas turbine engine, or a three-shaft gas turbine engine, or any kind of gas turbine engine adapted to generate mechanical power for mechanical drive or electric generation purposes, as the case may be. The gas turbine engine 7 can be a heavy-duty gas turbine engine, or an aero-derivative gas turbine engine.

The exhaust combustion gas is discharged from the gas turbine engine 7 through a stack 8. The exhaust combustion gas contains thermal energy at a temperature which may be as high as 700° C. The waste heat recovery circuit 5 is used to convert part of said waste heat into further useful power, specifically in the form of electric power.

In the embodiment of FIG. 1, waste heat is transferred from the gas turbine engine 7 to the waste heat recovery circuit 5 through an intermediate heat transfer loop 13, for safety reasons. In this way, a working fluid processed in the waste heat recovery circuit 5 does not circulate around the gas turbine engine 7. This is particularly useful if the working fluid used in the waste heat recovery circuit is a flammable or explosive fluid, e.g. an organic fluid such as cyclo-pentane.

A pump 13.1 circulates a heat transfer fluid (arrow F) in the closed intermediate heat transfer loop 13 through a first heat exchanger 13.2 and through a second heat exchanger 13.3. The first heat exchanger 13.2 is arranged upstream of the stack 8. In the first heat exchanger 13.2 the heat transfer fluid is in heat exchange relationship with the exhaust combustion gas discharged by the gas turbine engine 7 towards the stack 8. Heat is transferred from the exhaust combustion gas to the heat transfer fluid. In the second heat exchanger 13.3 the heat transfer fluid is in heat exchange relationship with the working fluid processed through the waste heat recovery circuit 5, for instance supercritical $CO_2$, or another organic fluid and heat is transferred from the heat transfer fluid to the working fluid.

In other embodiments, not shown, the intermediate heat transfer loop 13 can be dispensed with. This is particularly the case if the working fluid is not flammable or explosive, for instance, if $CO_2$ is used. If no intermediate heat transfer loop 13 is used, a heat exchanger is provided between the gas turbine engine 7 and the stack 8, through which heat is directly exchanged between the exhaust combustion gas and the working fluid circulating in the waste heat recovery circuit 5.

The waste heat recovery circuit 5 includes an integrated turboexpander-generator 21, wherein the rotary machinery required to convert waste heat into electric power is housed in a hermetically sealed casing 23. As used herein, a "hermetically sealed casing" is a casing, which has inlet and outlet flanges for the circulation of the working fluid, but does not have a rotary shaft protruding therefrom or facing the environment, such that no rotary seals are required and fluid leakages along rotary shafts are avoided.

A hermetically sealed casing can be formed by one or more casing sections, coupled to one another such that the rotary components of the turboexpander-generator are entirely and sealingly housed in the casing, while torque is transmitted from one casing section to the other through a magnetic joint, without the need for a mechanical transmission.

While several embodiments of the turboexpander-generator will be described in detail with reference to the following FIGS. 3 to 18, in FIG. 1 the turboexpander-generator 21 is illustrated only schematically as broadly including a turboexpander 25, a fluid pressurizing turbomachine 27 and an electric generator 29, mounted along a common shaft line 31. In the following description of several embodiments, the fluid pressurizing turbomachine 27 includes a compressor, as in preferred embodiments the working fluid circulating in the waste heat recovery circuit 5 performs a closed Brayton cycle, with no changes of phase of the working fluid. The use of a Rankine cycle is however not excluded. In such case the working fluid undergoes cyclic change of phase. In this case the fluid pressurizing turbomachine will include a turbopump.

High-pressure and high-temperature working fluid from the second heat exchanger 13.3 of the heat transfer loop 13 is expanded in the turboexpander 25 and heat contained in the working fluid is partly converted into mechanical power available on shaft line 31. The mechanical power is partly used to drive the compressor 27 and the exceeding mechanical power is converted into electric power by the electric generator 29. The electric power is delivered to the electric power distribution grid 11, possibly through a variable frequency drive (VFD) 33.

The expanded working fluid from the turboexpander 25 is chilled in a heat exchanger or heat sink 35, and delivered to the compressor 27. The compressed working fluid is delivered by the compressor 27 back to the heat exchanger 13.3.

The embodiment of FIG. 1 further comprises a heat recuperator 39 upstream of the heat sink 35. The heat recuperator 39 includes a heat exchanger that transfers heat from the expanded working fluid to the compressed working fluid, between the delivery side of compressor 27 and the second heat exchanger 13.3.

The waste heat recovery circuit 5 of FIG. 1 is a simplified circuit. A more complex waste heat recovery circuit 5 is illustrated in the embodiment of FIG. 2, where the same reference numbers indicate identical or equivalent parts as those shown in FIG. 1 and described above.

Figure 2:
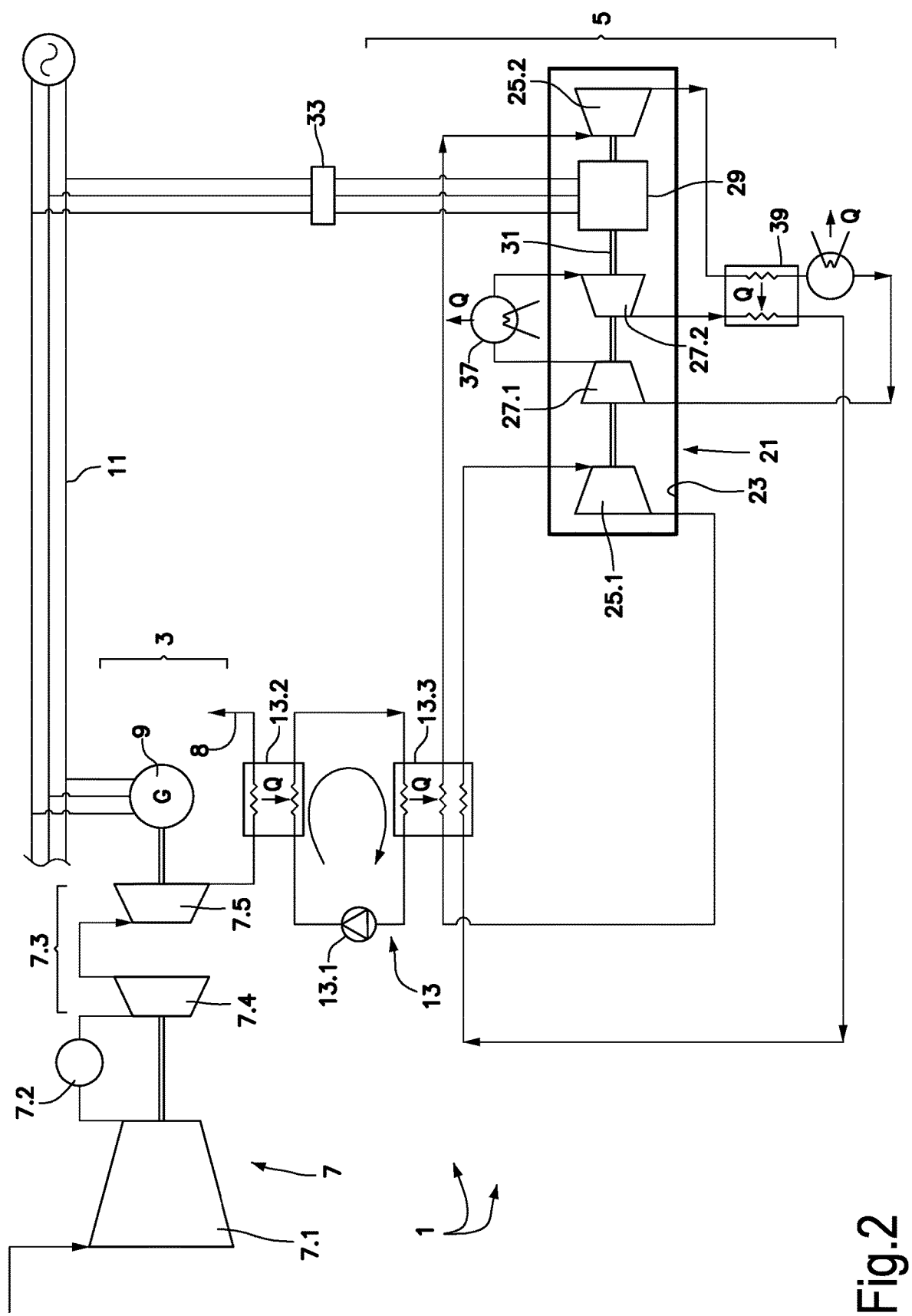

In FIG. 2 the integrated turboexpander-generator 21 includes a two-section turboexpander 25 and a two-section compressor 27.

The first and second turboexpander sections are labeled 25.1 and 25.2, respectively and are arranged in series, i.e. in sequence. The compressed and heated working fluid from the second heat exchanger 13.3 is partly expanded in the first turboexpander section 25.1 and further expanded to the final low pressure in the second turboexpander section 25.2.

In the embodiment of FIG. 2 the turboexpander 25 is a reheated turboexpander. The partly expanded working fluid discharged from the first turboexpander section 25.1 is reheated in the second heat exchanger 13.3 prior to be subject to final expansion in the second turboexpander section 25.2.

The first and second compressor sections are labeled 27.1 and 27.2 and are arranged in series. The expanded working fluid from the turboexpander 25 is partly compressed in the first compressor section 27.1 and further compressed to the final high-pressure in the second compressor section 27.2.

In the embodiment of FIG. 2 the compressor 27 is an intercooled compressor. The partly compressed working fluid delivered by the first compressor section 27.1 is cooled in an intercooler heat exchanger 37 before being processed through the second compressor section 27.2.

Moreover, the waste heat recovery cycle 5 of FIG. 2 further comprises a heat recuperator 39. The heat recuperator 39 is aimed at exchanging heat between the expanded working fluid discharged by the second turboexpander section 25.2 and the compressed working fluid delivered by the second compressor section 27.2. Since the expanded working fluid discharged by the second turboexpander section 25.2 is at a higher temperature than the compressed working fluid delivered by the second compressor section 27.2, the recuperator 39 allows recovery of low-temperature heat from the exhaust working fluid, thus increasing the overall efficiency of the cycle.

While in FIG. 2 reheating, intercooling and heat recuperation are provided in combination, it shall be understood that in other embodiments, not shown, one or two of these efficiency-enhancing arrangements may be foreseen. For example, an intercooled compressor can be used in a cycle with heat recuperation but without reheating, or else with reheating and without heat recuperation. Similarly, heat recuperation can be used alone, without compressor intercooling and without reheating, or with an intercooled compressor without reheating, or else with reheating but without compressor intercooling.

In all embodiments, the rotary machines required to convert heat into electric power, namely turboexpander, compressor and electric generator, are all housed in the same hermetically sealed casing 21, with the rotary components of the machinery on the same shaft line.

As will become apparent from the following description of various embodiments of the integrated turboexpander-generator 21, the sequence in which the rotary machines are arranged in the casing 23 can be different from what is schematically shown in FIGS. 1 and 2.

With continuing reference to FIGS. 1 and 2, the following FIGS. 3 to 18 schematically illustrate different arrangements of the machinery forming the integrated turboexpander-generator and compressor 21. FIGS. 3 to 18 show only schematically the rotary components of the integrated turboexpander-generator 21 and the mutual relationship therebetween. The outer hermetically sealed casing is omitted.

In all embodiments a single shaft line is provided, which is supported for rotation by a plurality of active magnetic bearings. As will be described in more detail below, the shaft line can include a single shaft, or a plurality of shafts, i.e. shaft line portions, for instance two shafts, drivingly coupled to one another by respective joints, to form a single shaft line where all shafts or shaft portions rotate at the same rotary speed, except the difference due to angular oscillations allowed by a flexible joint, if any, provided along the shaft line.

Figure 3:
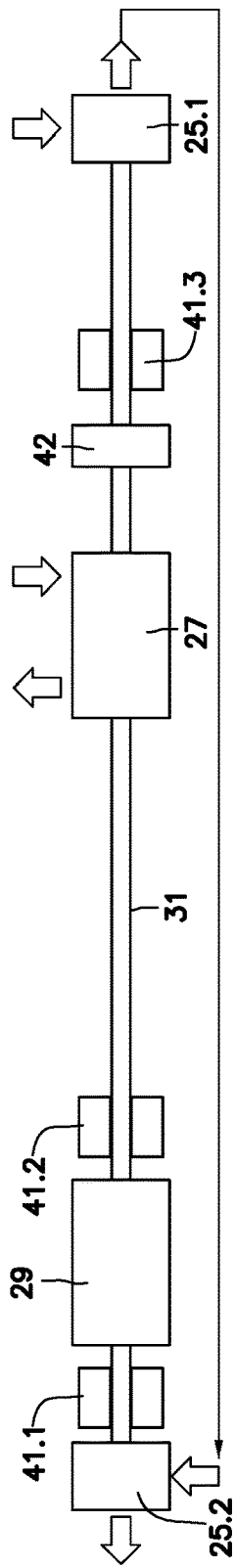

Referring now to FIG. 3, in an embodiment the turboexpander 25 has a first turboexpander section 25.1 mounted at an end of the shaft line 31, and a second turboexpander section 25.2, mounted at the opposite end of the shaft line 31. The first and second turboexpander sections 25.1 and 25.2 are arranged in sequence, i.e. the working fluid is partly expanded in the first turboexpander section 25.1 and subsequently delivered to the second turboexpander section 25.2 for further expansion, with or without intermediate reheating, see below.

In preferred embodiments, both the first section 25.1 and the second section 25.2 of the turboexpander 25 are mounted in a cantilever fashion, i.e. overhung, beyond the end bearing 41.1 and 41.3, respectively, rather than in an in-between configuration as in the previously described embodiments. The compressor 27 and the electric generator 29 are arranged in-between bearings. The number of radial bearings required is thus reduced. An easier access to the turboexpander sections is obtained.

The turboexpander sections 25.1 and 25.2 are preferably mounted in a back-to-back configuration, and are preferably radial, i.e. centripetal, turboexpanders, with a radial inlet and an axial outlet, as schematically shown by the arrows in FIG. 3. An efficient balancing of axial thrusts is achieved.

In other embodiments, the turboexpander can be an axial turboexpander.

Preferably, when two turboexpander sections are arranged at the opposite ends of the shaft line 31, the electric generator 29 is arranged next to the second turboexpander section 25.2, where the temperature of the working fluid is lower, such that the thermal load on the electric generator 29 is reduced.

Figure 4:
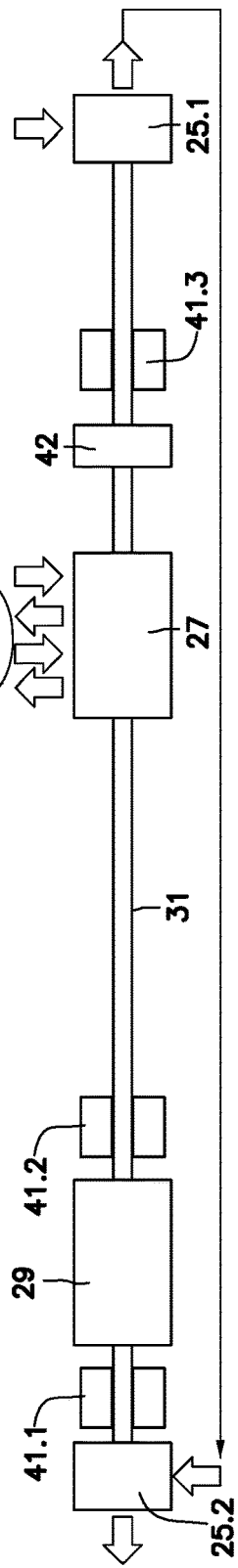
Figure 5:
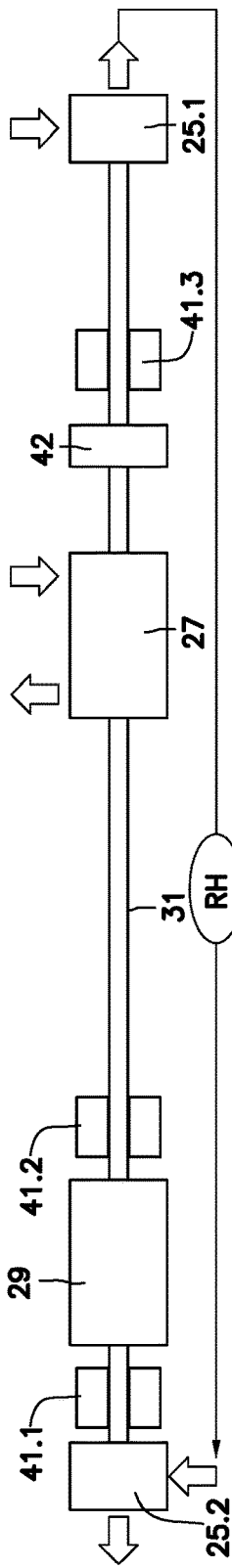
Figure 6:
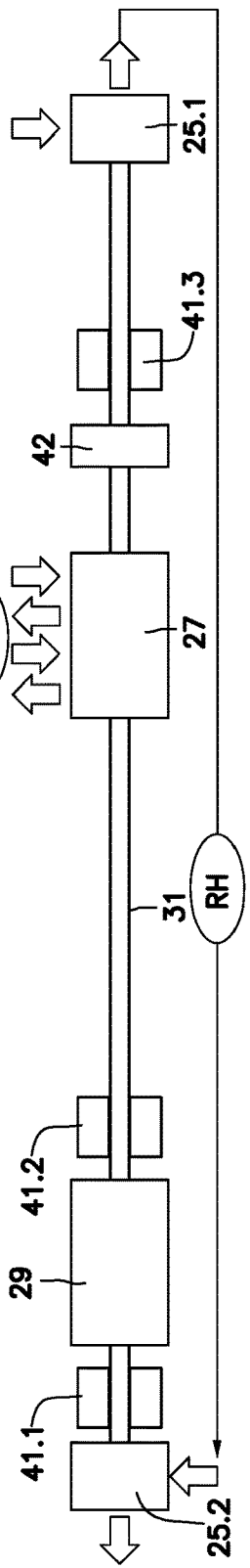
Figure 11:
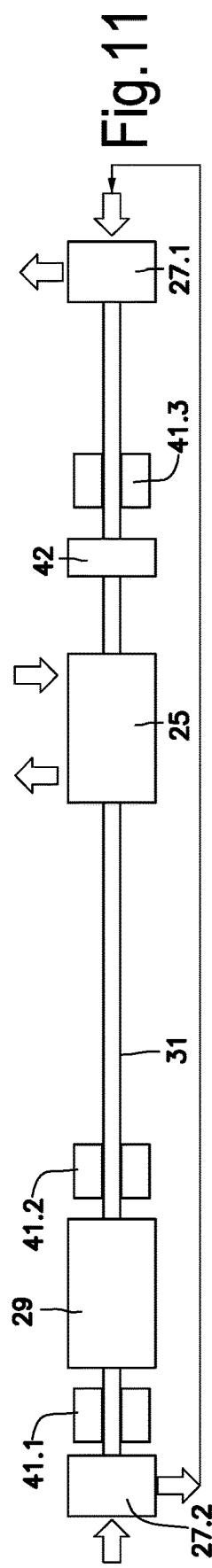
Figure 12:
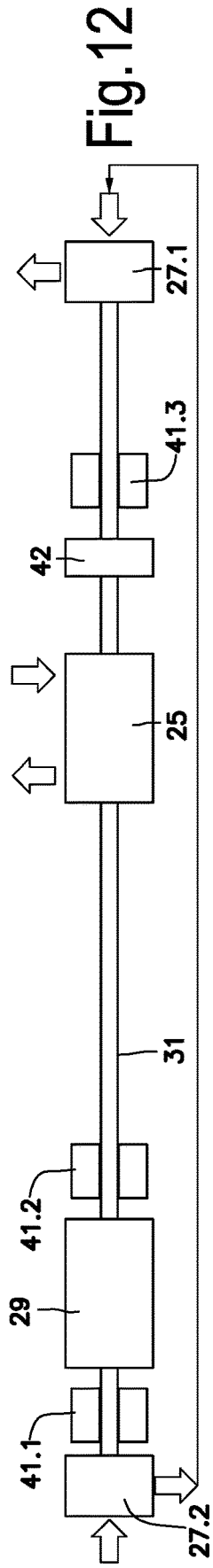

The embodiment of FIG. 3 can be further modified by using a reheated turboexpander 25 and/or an intercooled compressor 27. FIG. 4, where the same reference numbers are used as in FIG. 3 to designate the same parts, shows an intercooled compressor 27 (see IC). FIG. 5, where again the same reference numbers are used as in FIG. 3 to designate the same parts, shows a turboexpander 25 with reheating (RC). FIG. 6 illustrates an embodiment including both compressor intercooling and turboexpander reheating.

The embodiments of FIGS. 7, 8, 9 and 10 are similar to the embodiments of FIGS. 3, 4, 5 and 6, but are provided each with a joint 51 which divides the shaft line into two portions or sections 31.1 and 31.2. In the embodiments of FIGS. 7, 8, 9 and 10 the joint 51 can be a flexible joint radially disconnecting the electric generator 29 from the rest of the shaft line. In other embodiments the joint 51 can be a magnetic joint, physically disconnecting the generator casing from the turboexpander and compressor casing, allowing isolation of the generator cooling gas system and controlling generator windage losses. As shown in the sequence of FIGS. 7, 8, 9 and 10, the turboexpander 25 (25.1, 25.2) can be a reheated turboexpander (FIGS. 9 and 10) and the compressor 27 can be an intercooled compressor (FIGS. 8 and 10).

In other embodiments, the compressor 27 can be a two-section compressor, wherein the two sections are arranged at opposite ends of the shaft line 31, in a cantilever fashion, i.e. in an overhung arrangement, while the turboexpander 25 is arranged in an in-between bearing arrangement, similarly to the electric generator 29.

Figure 13:
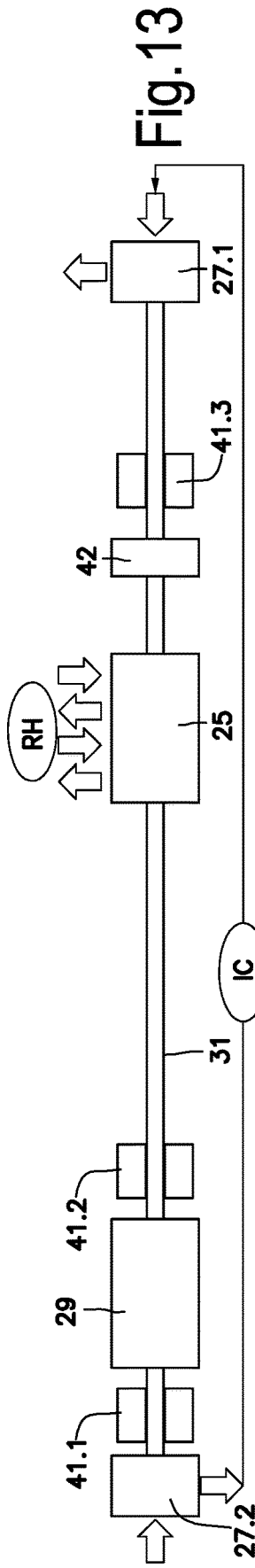
Figure 14:
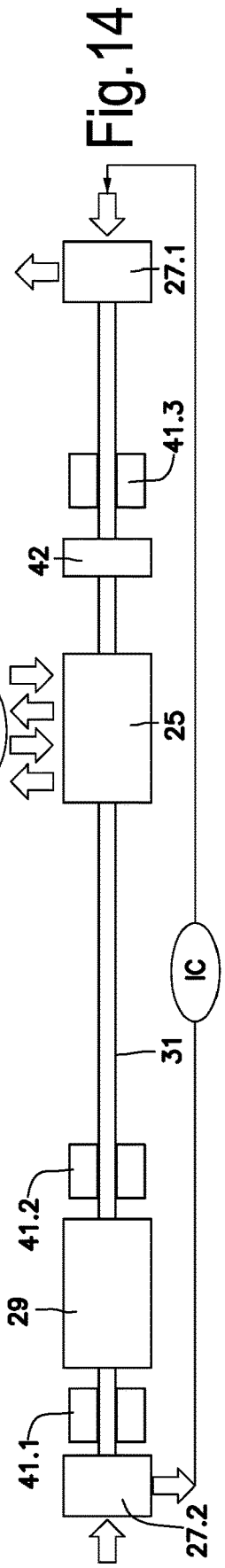

FIGS. 11, 12, 13 and 14 show four embodiments of this kind, where the compressor 27 comprises a first compressor section 27.1 overhung at one end of the shaft line 31 and a second compressor section 27.2 overhung at the opposite end of the shaft line 31. The electric generator 29 and the turboexpander 25 are arranged between respective radial bearings 41, i.e. in an in-between bearings configuration. The four embodiments of FIGS. 11, 12, 13 and 14 differ from one another in that the first embodiment does provide neither reheating of the turboexpander nor intercooling of the compressor; the embodiment of FIG. 12 comprises a compressor 27 with intercooling (IC), but has no reheating of the turboexpander; FIG. 13 comprises a reheated (RH) turboexpander 25, but no intercooling of the compressor 27; finally the embodiment of FIG. 14 includes a reheated turboexpander 25 and an intercooled compressor 27.

Preferably, in the four embodiments of FIGS. 11, 12, 13 and 14 the turboexpander 25 is arranged such that the discharge end thereof faces the electric generator 29 for the reasons already discussed above.

The embodiments of FIGS. 11, 12, 13 and 14 can be further modified by introducing one or more joints along the shaft line 31. FIGS. 15, 16, 17 and 18 show embodiments similar to those of FIGS. 11, 12, 13 and 14, but with the addition of a joint 51 between the electric generator 29 and the turboexpander 25. An additional radial bearing is also provided. The remaining components of the embodiments of FIGS. 15, 16, 17 and 18 correspond to those of FIGS. 11, 12, 13 and 14 and are labeled with the same reference numbers.

While in the embodiments described above the hermetically sealed casing arrangement includes a single casing, if one or more magnetic joints are provided along the shaft line 31, the casing arrangement can be formed by two or more separate casings or casing portions. When a casing arrangement comprising two separate casing portions 23.1 and 23.2 is used, a complete separation is obtained between the interior of the two casing portions.

Figure 20:
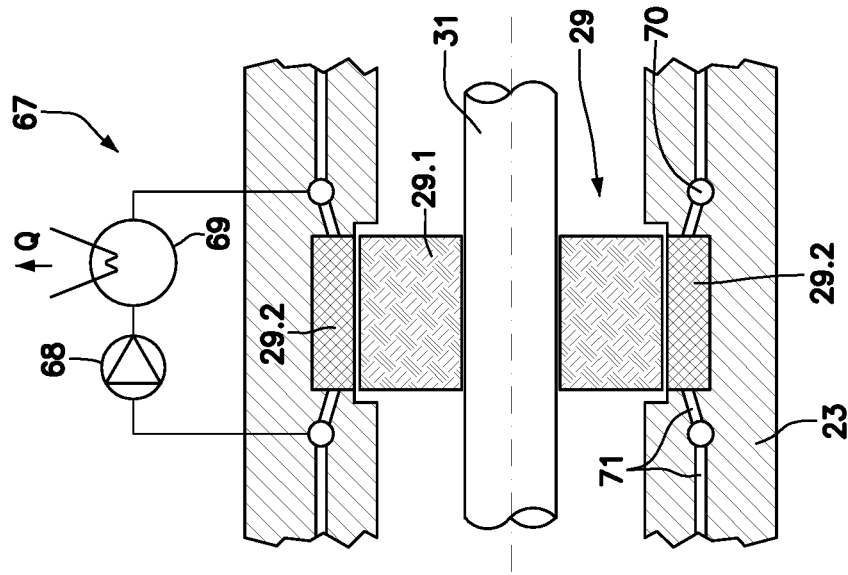
FIG. 20 illustrates a schematic sectional view of the electric generator and relevant cooling circuit.
Figure 19:
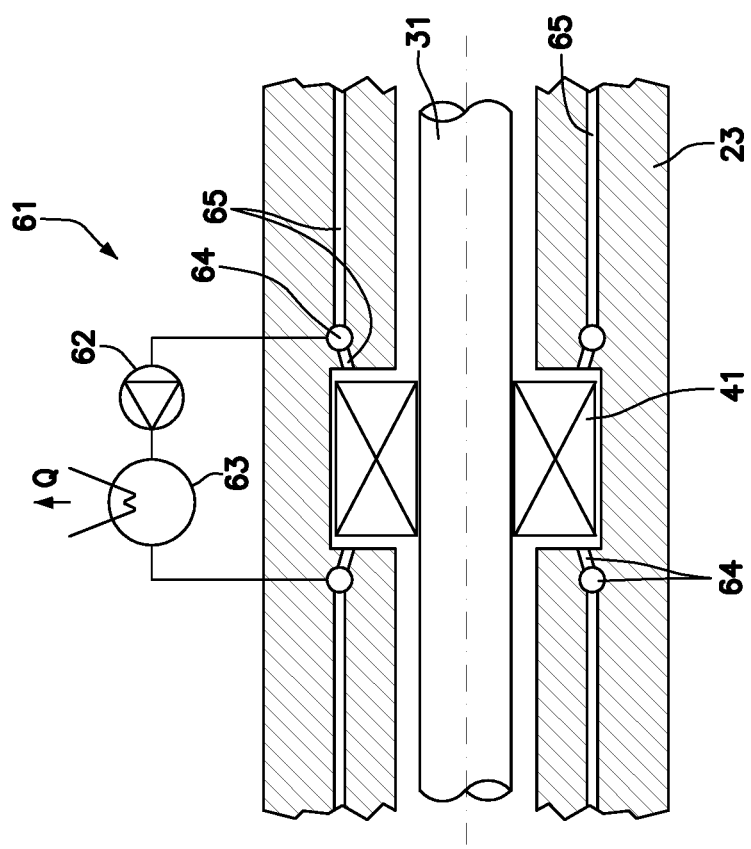
FIG. 19 illustrates a schematic sectional view of an active magnetic bearing and relevant cooling circuit.

As mentioned above, the active magnetic bearings 41, 42 and the electric generator 29 can be provided with a cooling circuit using the working fluid processed by the integrated turboexpander-generator as a cooling medium. FIGS. 19 and 20 show schematics of an active magnetic bearing 41 and of the electric generator 29 with relevant schematically represented cooling circuit.

A cooling circuit 61 for the active magnetic bearings 41, 42 is shown in FIG. 19 and includes a circulating pump or fan 62 and a heat exchanger 63, through which the cooling medium is circulated to discharge heat removed from the active bearings 41, 42. Reference numbers 64, 65 indicate cavities and ducts for the circulation of the cooling medium through the active magnetic bearings. 41, 42.

A cooling circuit 67 for the electric generator 29 is schematically shown in FIG. 20. The electric generator 29 is represented as including a rotor 29.1 rotationally mounted on shaft 31 and a stator 29.2 stationarily housed in the casing 23. A pump or fan 68 circulates the cooling medium thorough a heat exchanger 69 to remove heat therefrom. Cavities 70 and ducts 71 are disposed inside the casing 23 for circulating the cooling medium through the stator 29.2 of the electric generator 29.

The cooling circuits 61 and 67 may be combined in a single cooling circuit.

By using the same working fluid as a cooling medium, the system consisting of the integrated turboexpander-generator 21 and relevant cooling circuit(s) can be hermetically sealed, thus avoiding leakages of working fluid towards the environment surrounding the casing 23.

While the invention has been described in terms of various specific embodiments, it will be apparent to those of ordinary skill in the art that many modifications, changes, and omissions are possible without departing form the spirit and scope of the claims.

The invention claimed is:

1. A thermodynamic system comprising:
   a gas turbine engine comprising an air compressor, a combustion chamber coupled to the air compressor, a high-pressure turbine, and a low-pressure turbine; and
   a waste heat source adapted to transfer heat to a working fluid processed through an integrated turboexpander-generator, the integrated turboexpander-generator comprising:
   a hermetically sealed casing, the hermetically sealed casing enclosing,
      a reheated turboexpander;
      a fluid pressurizing turbomachine;
      an electric generator; and
      a shaft line comprising a first shaft, a second shaft, a magnetic joint coupling the first shaft to the second shaft, and active magnetic bearings supporting the first shaft and the second shaft,
   wherein the reheated turboexpander, the fluid pressurizing turbomachine, and the electric generator are arranged on the shaft line in the hermetically sealed casing,
   wherein the reheated turboexpander is arranged between the active magnetic bearings,
   wherein the fluid pressurizing turbomachine comprises a first compressor and a second compressor fluidly coupled in sequence and arranged a first end of the shaft line and at a second end of the shaft line, respectively,
   wherein the electric generator and the reheated turboexpander are arranged between the first compressor section and the second compressor, and
   wherein the integrated turboexpander-generator is adapted to convert part of the waste heat into electrical power.

2. The thermodynamic system of claim 1, further comprising:
   a heat transfer loop coupling the gas turbine engine to the turbo-expander generator.

3. The turboexpander-generator of claim 1, wherein the turboexpander has a first turboexpander section and a second turboexpander section.

4. The turboexpander-generator of claim 1, wherein the fluid pressurizing turbomachine is one of a compressor and a pump.

5. The turboexpander-generator of claim 1, wherein the multi-section fluid pressurizing turbomachine is an intercooled turbomachine.

6. The turboexpander-generator of claim 1, wherein the electric generator is arranged between active magnetic bearings.

7. The turboexpander-generator of claim 1, wherein the active magnetic bearings comprises a first set of active magnetic bearings and a second set of active magnetic bearings.

8. The thermodynamic system of claim 1, further comprising:
   a two-shaft gas turbine engine.

9. A thermodynamic system comprising:
   a gas turbine engine;
   a waste heat source adapted to transfer heat to a working fluid processed through an integrated turboexpander-generator; and
   a pair of heat exchangers coupled to the gas turbine engine and to the integrated turbo-expander generator;

wherein the integrated turboexpander-generator comprises:
   a hermetically sealed casing, the hermetically sealed casing enclosing,
   a reheated turboexpander;
   a fluid pressurizing turbomachine;
   an electric generator; and
   a shaft line comprising a first shaft, a second shaft, a magnetic joint coupling the first shaft to the second shaft, and active magnetic bearings supporting the first shaft and the second shaft,
wherein the reheated turboexpander, the fluid pressurizing turbomachine, and the electric generator are arranged on the shaft line in the hermetically sealed casing,
wherein the reheated turboexpander is arranged between the active magnetic bearings,
wherein the fluid pressurizing turbomachine comprises a first compressor and a second compressor fluidly coupled in sequence and arranged a first end of the shaft line and at a second end of the shaft line, respectively,
wherein the electric generator and the reheated turboexpander are arranged between the first compressor section and the second compressor, and
wherein the integrated turboexpander-generator is adapted to convert part of the waste heat into electrical power.

10. The turboexpander-generator of claim 9, wherein the fluid pressurizing turbo machine comprises a compressor or a pump.

11. The turboexpander-generator of claim 9, wherein the electric generator is arranged between active magnetic bearings.

12. The turboexpander-generator of claim 9, wherein the active magnetic bearings comprises a first set of active magnetic bearings and a second set of active magnetic bearings.

13. A thermodynamic system comprising:
   a gas turbine engine comprising an air compressor, a combustion chamber coupled to the air compressor, a high-pressure turbine, and a low-pressure turbine;
   a first heat exchanger coupled to the low-pressure turbine;
   a second heat exchanger coupled to the first heat exchanger and to the turbo-expander generator; and
   a waste heat source adapted to transfer heat to a working fluid processed through an integrated turboexpander-generator, the integrated hermetically sealed turboexpander-generator, comprising:
   a hermetically sealed casing, the hermetically sealed casing enclosing,
   a reheated turboexpander;
   a fluid pressurizing turbomachine;
   an electric generator; and
   a shaft line comprising a first shaft, a second shaft, a magnetic joint coupling the first shaft to the second shaft, and active magnetic bearings supporting the first shaft and the second shaft,
wherein the reheated turboexpander, the fluid pressurizing turbomachine, and the electric generator are arranged on the shaft line in the hermetically sealed casing,
wherein the reheated turboexpander is arranged between the active magnetic bearings,
wherein the fluid pressurizing turbomachine comprises a first compressor and a second compressor fluidly coupled in sequence and arranged a first end of the shaft line and at a second end of the shaft line, respectively,
wherein the electric generator and the turboexpander are arranged between the first compressor section and the second compressor, and
wherein the turboexpander-generator is adapted to convert part of the waste heat into electrical power.

14. The turboexpander-generator of claim 13, wherein the electric generator is arranged between active magnetic bearings.

15. The turboexpander-generator of claim 13, wherein the active magnetic bearings comprises a first set of active magnetic bearings and a second sent of active magnetic bearings.

\* \* \* \* \*